Jan. 9, 1962 W. F. NEWBOLD 3,016,197

SQUARE ROOT EXTRACTING INTEGRATOR

Filed Sept. 15, 1958 2 Sheets-Sheet 1

INVENTOR.
WILLIAM F. NEWBOLD

BY Arthur H. Swanson

ATTORNEY.

Jan. 9, 1962 W. F. NEWBOLD 3,016,197

SQUARE ROOT EXTRACTING INTEGRATOR

Filed Sept. 15, 1958 2 Sheets-Sheet 2

INVENTOR.
WILLIAM F. NEWBOLD

BY Arthur H. Swanson

ATTORNEY.

3,016,197
Patented Jan. 9, 1962

3,016,197

SQUARE ROOT EXTRACTING INTEGRATOR

William F. Newbold, Montgomery County, Pa., assignor to Minneapolis-Honeywell Regulator Company, Minneapolis, Minn., a corporation of Delaware Filed Sept. 15, 1958, Ser. No. 760,993
11 Claims. (Cl. 235—183)

The present invention relates to electrical computing circuits. More specifically, the present invention relates to an electrical integrator.

An object of the present invention is to provide an improved electrical integrator.

An object of the present invention is to provide an improved integrator which is capable of extracting the square root of an input signal and integrating the resulting signal.

Still another object of the present invention is to provide an improved electrical integrator which is capable of integrating a non-electrical input signal.

A further object of the present invention is to provide an improved electrical integrator capable of simultaneously integrating a plurality of input signals.

A still further object of the present invention is to provide an improved integrator, as set forth, which is characterized by simplicity of operation and construction.

In accomplishing these and other objects, there has been provided, in accordance with the present invention, an electrical integrator which includes a signal comparator for comparing an input signal with a varying reference signal. The reference signal source comprises a serial combination of two unidirectional voltage amplifiers, each having capacitive feedback. The feedback capacitor of the first amplifier is connected to the amplifier through a polarity-reversing switch. A timing device is provided to periodically operate the polarity-reversing switch to effect the generation of the varying reference signal. The comparator energizes an accumulative output device when the reference signal is less than the input signal and deenergizes the output device when the reference signal is greater than the input signal.

A better understanding of the present invention may be had from the following detailed description when read in connection with the accompanying drawings, in which.

Figure 1:
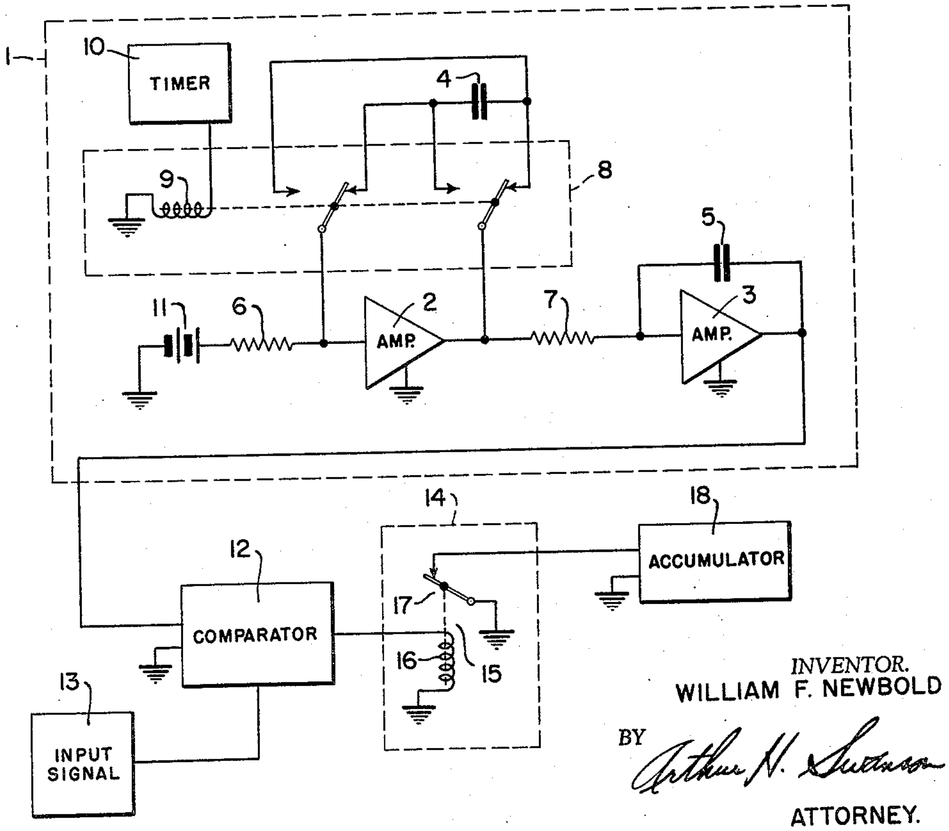
FIG. 1 is a schematic diagram of an electrical integrator embodying the present invention.

Referring to FIG. 1 in more detail, there is shown an electrical integrator with a reference signal source. The reference signal source 1 comprises a serial, or cascade, connection of two unidirectional voltage amplifiers, each having a respective feedback capacitor 4, 5 and input resistor 6, 7. The operational amplifiers 2, 3 are hereinafter referred to as a first amplifier 2 and a second amplifier 3 with corresponding designations for their respective feedback capacitors and input resistors. Each of these combinations of amplifier, feedback capacitor, and input resistor forms a typical signal integrating circuit. The operation of such an integrating circuit is well-known in the art as described on page 138 of "Electronic Analogue Computers" by Korn and Korn, published by McGraw-Hill in 1952.

Briefly, this type of integrating circuit integrates an input signal by accumulating a charge on the feedback capacitor to represent a summation of the input signal during a period of time. The operational amplifier is used to linearize the charging operation of the feedback capacitor and to obviate, partially, the opposition of the accumulated charge with respect to the input signal.

A first feedback capacitor 4 associated with the first operational amplifier 2 is connected to the amplifier 2 through a polarity reversing switch 8, actuated by a relay coil 9. The relay coil 9 is periodically energized by a timer 10. The timer 10 may be any suitable one of many electronic or electro-mechanical devices used to periodically and recurrently provide an energizing signal; such devices being well-known in the art.

Figure 2:
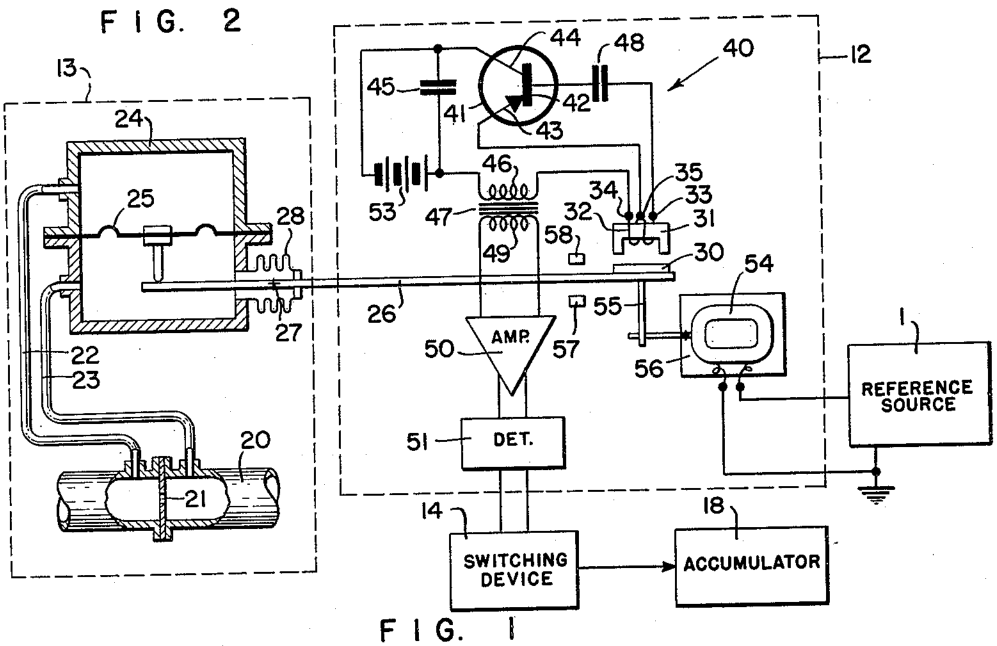
FIG. 2 is a schematic diagram of a comparator and an input signal source for the electrical integrator shown in FIG. 1.

A control signal for the first operational amplifier 2 is obtained from a unidirectional voltage supply, represented by a battery 11. An output signal from the cascaded second operational amplifier 3 is applied as one input signal to a comparator 12. The comparator 12 may be any suitable one of many electrical or electro-mechanical devices used to compare two input signals to determine whether or not one signal equals the other; such devices being well-known in the art. A suitable device for comparing an electrical input signal with a mechanical input signal is shown in FIG. 2, which will be discussed in detail hereinafter. A second input signal to the comparator 12 is obtained from a unidirectional signal source 13. The signal source 13 may be a monitoring transducer measuring fluid flow or other physical variables. One well-known form that the signal source 13 may take is also illustrated in FIG. 2. A characteristic of the signal obtained from such a signal source is that the signal is proportional to the square of the volume of fluid flow. The integration of the square root of the output signal of such a signal source would, consequently, represent a measurement of the total flow during the period of integration.

The output signal of the comparator 12 is applied to a switching device 14. The switching device 14 may, for example, be a relay 15 having a relay coil 16 connected to be energized by the output signal from the comparator 12. A pair of relay contacts 17, controlled by the relay coil 16 are connected to an accumulator 18. The accumulator 18 may be any suitable one of many electrical and electro-mechanical devices used to produce an output signal representative of the duration of an input signal; such devices being well-known in the art. An example of a suitable electro-mechanical device is a motor-driven slidewire having the energization of the drive motor controlled by the relay contacts 17.

Referring to FIG. 2, there is shown a signal source 13 including a flow line 20 having an orifice 21 therein. Spaced on opposite sides of the orifice 21 are a pair of pressure take-off connections 22 and 23 which are connected to a differential pressure sensing device 24. This device 24 includes a resilient diaphragm 25 which is deflected in accordance with the relative pressure variations from the pressure connections 22 and 23. The force from the diaphragm 25 resulting from the pressure connections 22 and 23 is applied to a beam 26 which is pivoted at a fulcrum 27. The beam is extended, through a sealing bellows 28, from the measuring device 24 to the comparator 12 to supply an input signal thereto.

The beam 26 carries, at its outer end, a magnetic member 30 which cooperates with a magnetic core structure 31, in the comparator 12, having a coil 32 wound thereon. The coil 32 is a tapped coil having a pair of end-terminals 33 and 34 and a tap 35. The inductance of the coil 32 is effectively varied by the relative positioning of the magnetic member 30 relative to the core structure 31. The coil 32 is the principal oscillation amplitude control means for an oscillator circuit 40. This oscillator circuit 40 includes a transistor 41 having a base electrode 42, an emitter electrode 43 and a collector electrode 44. The emitter electrode 43 is connected to the coil tap 35, and the collector electrode 44 is connected to one coil-end-terminal 34 through a bypass capacitor 45 and the primary winding 46 of a transformer 47.

The secondary winding 49 of the transformer 47 is connected to the amplifier 50 and an oscillation detector 51. The detector 51 has a direct current output signal which is applied to the switching device 14. The base electrode 42 is connected to the other coil-end-terminal 33 by means of a connecting capacitor 48. A battery 53 is shown as the source of power for the oscillator circuit 40.

The output signal from the reference signal source 1 is applied to a force coil 54 attached to the beam 26 through a connecting mechanism 55. The force coil 54 cooperates with a magnetic structure 56, producing a magnetic field, to create a force on the beam 26, through the connecting mechanism 55, in accordance with the output signal from the source 1. A suitable form of the force coil 54 and the magnetic structure 56 for use with the present invention is shown in Patent No. 2,847,619 by Philip E. Shafer, issued on August 12, 1958, particularly in Figs. 2, 3, and 4, therein. A pair of lower and upper limit stops 57 and 58, respectively, are positioned with relation to the beam 26 to limit the movement of the beam 26 and the force coil 54. The mode of operation of the comparator 12 and the signal 13, shown in FIG. 2, follows.

It should first be noted that the apparatus shown in FIG. 2 has normal tendency for the oscillator 40 to be in oscillation. The direct current flow through the oscillator 40, during oscillation, may be traced from the positive terminal of the battery 53 through the transformer primary winding 46, terminal 34, coil 32, tap 35, emitter 43, collector 44, and back to the negative terminal of the battery 53. The oscillating current flow of the oscillator 40 may be traced from the collector 44 through the bypass capacitor 45, transformer primary winding 46, terminal 34, coil 32, tap 35, to the emitter 43. The feedback signal which sustains the oscillations is produced by coil 32 due to the alternating current passing through a portion of the coil 32. This current induces a voltage in the other portion of the coil 32 between the tap 35 and the terminal 33. Since this terminal 33 is connected to the base 42 through the connecting capacitor 48, the circuit will stay in oscillation.

The amplitude of the oscillations of the oscillator 40 will determine the value of the alternating current flowing through the transformer primary winding 46. The amplitude of the oscillations is regulated by varying the inductance of the coil 32. This is accomplished by varying the air-gap between the magnetic member 30 and the magnetic core structure 31. This air-gap is varied by a combination of the forces acting on the beam 26; namely, the force of the diaphragm 25 and the force of the force coil 54. Thus, for a particular combination of these forces, there will be a corresponding alternating current flowing in the transformer primary winding 46. The transformer secondary winding 49 supplies an alternating signal, corresponding to the primary winding current, to the amplifier 50. The alternating output signal from the amplifier 50 is detected by the detector 51 to produce a corresponding direct current output signal. This output signal is applied to an energizing signal to the switching device 14.

The mode of operation of the apparatus of the present invention, shown in FIG. 1, follows.

Figure 3:
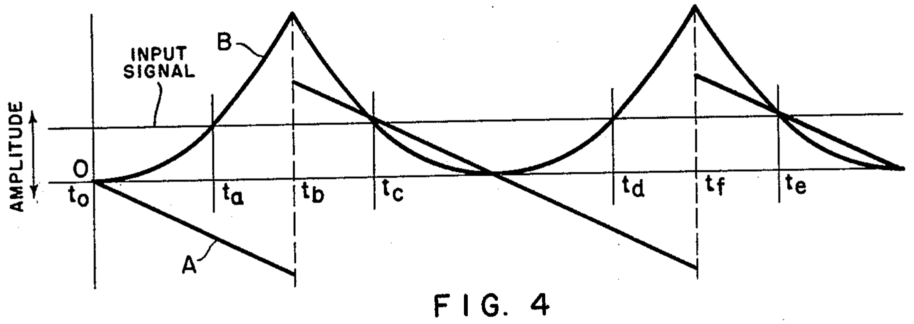
FIG. 3 is a representation of the waveshapes of the signals occuring at two points in a reference signal source for the integrator shown in FIG. 1.

Assuming the feedback capacitors 4 and 5 of the operational amplifiers 2 and 3 are initially uncharged and the reversing switch 8 is initially in one of two positions; e.g., the position illustrated in the figure, the unidirectional control signal from the voltage supply 11 is integrated by the first operational amplifier 2 and feedback capacitor 4 in a manner as previously mentioned. An output signal from this first integrating circuit is applied to the second operational amplifier 3 and feedback capacitor 5. Referring to FIG. 3, there is shown a diagram of the electrical waveshapes occurring simultaneously at two different points in the reference signal source 1. Waveshape "A" is a representation of the output signal of the first operational amplifier 2. Waveshape "B" is a representation of the output signal of the second operational amplifier 3. Thus, starting at a time labeled "$t_0$," in FIG. 3, the output signals of the two integrating circuits are shown by the two waveshapes A and B. At a time labeled "$t_b$," the timer 10, shown in FIG. 1, energizes the relay coil 9 of the reversing switch 8. As a result, the connection of the first feedback capacitor 4 to the first operational amplifier 2 is reversed with respect to its initial connection. This reversal of the feedback capacitor 4 reverses the polarity of the output signal of the first integrating circuit, as shown in FIG. 3. The further integration of the unidirectional control signal is continued in a manner similar to that described above with the additional conditions that the first feedback capacitor 4 is precharged to a maximum integrated voltage and the second feedback capacitor 5 is precharged to an integrated value of the maximum output signal of the first integrating circuit. Consequently, the integration operation continues, as shown in FIG. 3, with a discharge of both feedback capacitors 4 and 5 to bring the respective output signals, represented as mentioned above by the two waveshapes A and B to a zero output signal level. The first feedback capacitor 4 is subsequently recharged to a value substantially equal to that value previously obtained with a corresponding recharge of the second feedback capacitor 5. At a time labeled "$t_f$," the timer 10 deenergizes the relay coil 9 of the reversing switch 8. The connection of the first feedback capacitor 4 is again reversed and the integration operation is continued in a manner similar to that described above in relation to the first reversal of the first feedback capacitor 4.

The reference signal, obtained from the second integrating circuit, is continuously applied to the comparator 12. Assuming the comparator 12 is of the form shown in FIG. 2, this reference signal is applied to the force coil 54. The oscillator 40 is arranged to increase the amplitude of its oscillation when the effect of the reference signal applied to the force coil 54 is less than that of the input signal. Consequently, for a constant unidirectional input signal from the input signal source 13, the effect of a decreasing reference signal applied to the force coil 54 is to approach an equality between the force exerted by the force coil 54 and the force produced by the input signal source 13. Thus, when the forces are equal, the beam 26 is positioned equidistant between the two limit stops 57 and 58. However, since the reference signal continues to decrease below the point of force equality, the force exerted by the input signal is made dominant, and the beam 26 is positioned against the upper limit stop 58. The output signal of the comparator 12 attains a value at the point of force equality sufficient to effect an energization of the switching device 14 at a point corresponding to a balanced condition of the beam 26. In general, the balanced condition of the beam 26 represents a transition point of the switching device 14 between an energized state and a deenergized state.

Thus, a reference signal applied to the balancing coil 54 to produce an unbalance of the beam 26 in favor of the input signal from input signal source 13 is effective to energize the switching device 14. Conversely, an unbalance in favor of the reference signal is effective to deenergize the switching device 14. Referring to FIG. 3, the times labeled "$t_a$, $t_c$, $t_d$, and $t_e$," represent transitions of the reference signal with relation to the input signal. Consequently, between times $t_0$ and $t_a$ and $t_c$ and $t_d$, the input signal is greater than the reference signal, and the switching device 14 is correspondingly energized.

As mentioned previously, a characteristic of the differential pressure signal applied from the input signal source 13, shown in FIG. 2, the beam 26 is that the differential pressure is proportional to the square of the volume of fluid flow. Consequently, to obtain a measurement of the total volume of fluid flow, a signal representative of the square root of the differential pressure must be integrated. The characterized waveshape of the reference signal is arranged to extract the square-root of the differential pressure input signal during the integration operation. The square-root extraction may be explained by noting that the duration of time during which the switching device 14 is energized is dependent on the relative level of the input signal and the form of the waveshape of the reference signal. If the input signal were proportional directly to the volume of fluid flow, an integration operation would comprise an accumulation of the input signal during predetermined equal intervals of time. In order to extract the square root of the input signal, it is necessary to change the waveshape of the reference source 1 to produce the same durations of energization time as if the input signal were directly proprotional. The energization times of the switching device 14 produced by the reference signal are accumulated by the accumulator 18 as a representation of the measurement of the total volume of fluid flow. Using the previously mentioned motor-driven slidewire as a suitable device for the accumulator 18, the position of the slider on the slidewire, at the end of an integration period, would be representative of the integrated flow.

Figure 4:
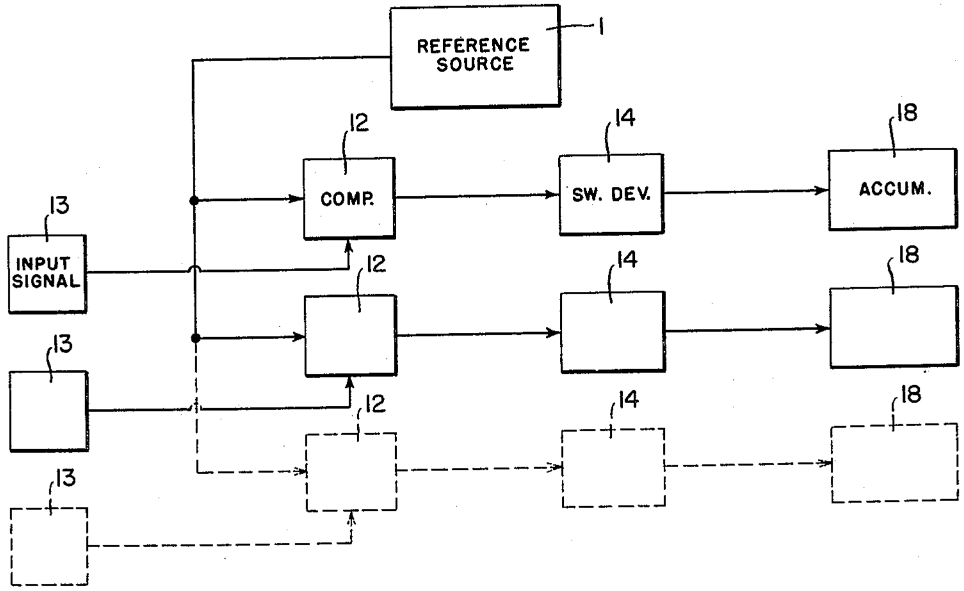
FIG. 4 is a schematic diagram of an electrical integrator embodying the present invention for use with multiple input signals.

The reference source of the present invention may be used to simultaneously integrate a plurality of input signals as shown in FIG. 4. A plurality of input signal sources 13 are connected to a plurality of comparators 12. Each of the comparators 12 may be substantially identical to the comparator 12 shown in FIG. 2. The comparators 12 are each connected to a corresponding switching device 14 controlling an accumulator 18. The reference signal from a reference signal source 1 is simultaneously applied to the plurality of comparators 12. The reference signal source 1 is substantially identical to the reference signal source 1 shown in FIG. 1. The integrating system shown in FIG. 4 operates in a manner as described above in relation to the integrator shown in FIG. 1, with the output signal of each accumulator 18 being representative of the integration of the signal from a corresponding input signal source 13.

Figure 5:
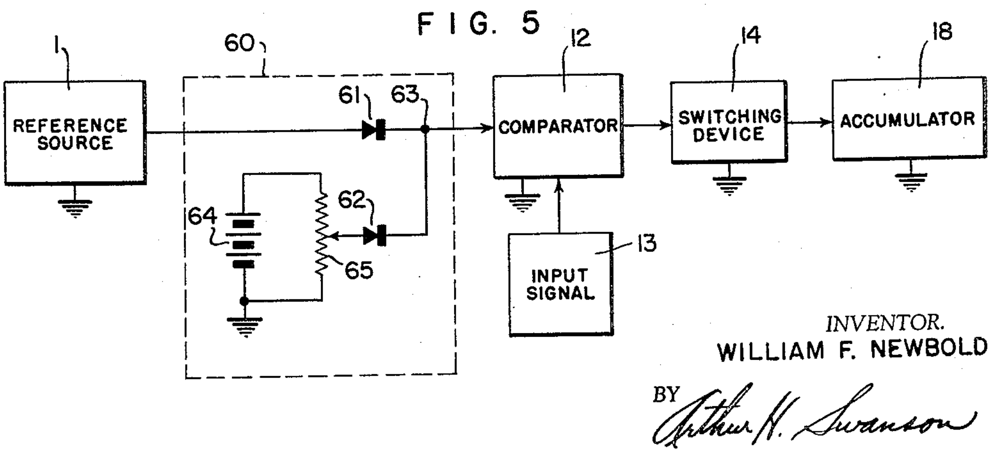
FIG. 5 is a schematic diagram of a somewhat different structure for an electrical integrator also embodying the present invention.

In FIG. 5, there is shown a somewhat different structure for the embodiment of the present invention. This structure corresponds substantially to FIG. 1 but includes the addition of an integration level selector 60. The level selector 60 comprises a pair of diodes 61 and 62 with their cathodes connected to an output terminal of the reference source 1. The anode of a level selector diode 62 is connected to a unidirectional voltage supply, represented by a battery 64 and a potentiometer-type resistor having a variable slider 65. This circuit operates, in a manner well-known in the art, to provide a so-called "clamping" action "relation to the minimum signal amplitude of the reference signal." Briefly, the level selector 60 limits the minimum amplitude of the reference signal to the voltage level established by the slider of the potentiometer-type resistor 65. Reference signal amplitudes above the pre-selected integration level back-bias the level selector diode 62 into non-conduction and appear at the common junction 63 through the forward-bias reference signal diode 61. However, when the reference signal amplitude becomes lower than the aforementioned integration level, the level-selector diode 62 is brought into a condition of forward-bias and the reference signal diode 61 is back-biased into non-conduction. The integration level signal, consequently, appears at the common junction 63 until the amplitude of the reference signal from the reference source 1 rises above the pre-set integration level. The integrator shown in FIG. 5 operates in a manner as described above in relation to the integrator shown in FIG. 1 with the exception that a minimum input signal is necessary to provide a transition of the reference signal with relation to the input signal.

As previously explained, the transition of the reference signal past the input signal is the controlling factor in the operation of the switching device 14. If the reference signal is always greater than the input signal, the switching device 14 is not actuated. Consequently, the integration level selector 60 is used to select a minimum input signal which is acceptable for integration.

While this invention has been described in terms of its environmental arrangement, this case is directed to the electrical integrating system. Other aspects of the disclosed system are shown and claimed in a copending application of Thomas A. Patchell filed on an even date herewith and bearing Serial No. 761,003 (now Patent No. 2,946,012).

Thus, it may be seen that there has been provided, in accordance with the present invention, an electrical integrator which is characterized by the ability to simultaneously integrate and extract the square root of an input signal and to integrate a non-electrical input signal.

What is claimed is:

1. An electrical integrator, comprising, in combination, an electrical function generating means, a comparison means for comparing an output signal from said generating means with an input information signal to be integrated, said comparison means including means for producing a control signal during the intervals corresponding to the time intervals whenever said input information signal is greater than the output signal from said generating means, time responsive accumulating means, and switching means responsive to the output signal from said comparison means, said last mentioned means connecting said accumulating means to said comparison means to energize said accumulating means during the time interval of the control signal from said comparison means.

2. An electrical integrator comprising, in combination, an electrical function generating means, said generating means being operative to produce a periodic amplitude-varying control signal, a signal comparison means, means for applying to said comparison means an information input signal to be integrated and said control signal, said comparison means comparing the information input signal with said control signal to produce an output signal during time intervals whenever the input signal is greater than the control signal, time responsive accumulating means, and switching means responsive to the output signal from said comparison means to energize said time responsive accumulating means thereby to integrate said input signal.

3. A square root extracting electrical integrating system comprising, in combination, an electrical function generating means, said generating means being operative to produce a square-law characterized amplitude-varying control signal, a signal comparison means, means for simultaneously applying to said comparison means the control signal from said generating means and an information input signal to be integrated, said comparison means being operative to produce an output signal when the information signal is greater than the control signal, accumulating means, and switching means responsive to the output signal from said comparison means to energize said accumulating means.

4. An electrical integrating system comprising, in combination, an electrical function generating means, said generating means being operative to produce a non-linear, amplitude-varying control signal, a signal comparison means, said signal comparison means including an oscillatory circuit, an oscillation-controlling variable impedance element, and a control means for said impedance element responsive to the relative magnitude of said control signal and an input signal to be integrated, said comparison means being operative to produce an output signal indicative of the condition of said impedance element, time responsive accumulating means, and switching means responsive to the output signal from said comparison means corresponding to that signal indicative of the condition of said impedance element when the input signal is greater than the control signal from said generating means to control said accumulating means.

5. An electrical integrator comprising, in combination, an electrical function generating means, said generating means including a pair of operational amplifiers connected in cascade relationship with each other, each of said operational amplifiers having a capacitor connected in feedback association therewith, a comparison means for comparing an output signal from said generating means with an input information signal to be integrated, said comparison means including means for producing a control signal during the intervals corresponding to the time intervals whenever said input information signal is greater than the output signal from said generating means, time responsive accumulating means, and switching means responsive to the output signal from said comparison means, said last mentioned means connecting said accumulating means to said comparison means to energize said accumulating means during the time interval of the control signal from said comparison means.

6. An electrical integrator comprising in combination, an electrical function generating means, said generating means including a first and a second operational amplifier connected in cascade relation with each other, each of said amplifiers having a capacitor connected in feedback association therewith, and a control means for periodically reversing with respect to said first amplifier the connection of said capacitor associated therewith, a comparison means for comparing an output signal from said generating means with an input information signal to be integrated, said comparison means including means for producing a control signal during the intervals corresponding to the time intervals whenever said input information signal is greater than the output signal from said generating means, time responsive accumulating means, and switching means responsive to the output signal from said comparison means, said last mentioned means connecting said accumulating means to said comparison means to energize said accumulating means during the time interval of the control signal from said comparison means.

7. An electrical integrator comprising in combination, an electrical function generating means, said generating means including a first and a second operational amplifier connected in cascade relation with each other, each of said amplifiers having a capacitor connected in feedback association therewith, and a control means for periodically reversing with respect to said first amplifier the connection of said capacitor associated therewith, said generating means being operative to produce a periodic amplitude-varying control signal, a signal comparison means, means for applying to said comparison means an information input signal to be integrated and said control signal, said comparison means comparing the information input signal with said control signal to produce an output signal during time intervals whenever the input signal is greater than the control signal, time responsive accumulating means, and switching means responsive to the output signal from said comparison means to energize said time responsive accumulating means thereby to integrate said input signal.

8. An electrical integrator comprising, in combination, an electrical function generating means, said generating means including a first and a second operational amplifier connected in cascade relation with each other, each of said amplifiers having a capacitor connected in feedback association therewith, and a control means for periodically reversing with respect to said first amplifier the connection of said capacitor associated therewith, said generating means being operative to produce a non-linear, amplitude-varying control signal, a signal comparison means, said signal comparison means including an oscillatory circuit, an oscillation-controlling variable impedance element, and a control means for said impedance element responsive to the relative magnitude of said control signal and an input signal to be integrated, said comparison means being operative to produce an output signal indicative of the condition of said impedance element, time responsive accumulating means, and switching means responsive to the output signal from said comparison means corresponding to that signal indicative of the condition of said impedance element when the input signal is greater than the control signal from said generating means to energize said accumulating means.

9. An electrical integrating system comprising, in combination, an electrical function generating means, a plurality of comparison means for comparing an output signal from said generating means with a corresponding one of a plurality of input information signals to be integrated, each of said comparison means including means for producing a control signal during the intervals corresponding to the time intervals whenever said input information signal is greater than the output signal from said generating means, a plurality of the time responsive accumulating means, and a plurality of switching means responsive to the output signal from a corresponding one of said plurality of comparison means, said last mentioned means connecting corresponding ones of said plurality of accumulating means to said plurality of comparison means to energize respective ones of said plurality of accumulating means during the time interval of the control signal from corresponding ones of said comparison means.

10. An electrical integrating system comprising, in combination, an electrical function generating means, said generating means including a first and a second operational amplifier connected in cascade relation with each other, each of said amplifiers having a capacitor connected in feedback association therewith, and a control means for periodically reversing with respect to said first amplifier the connection of said capacitor associated therewith, a plurality of comparison means for comparing an output signal from said generating means with a corresponding one of a plurality of input information signals to be integrated, each of said comparison means including means for producing a control signal during the intervals corresponding to the time intervals whenever said input information signal is greater than the output signal from said generating means, a plurality of the time responsive accumulating means, and a plurality of switching means responsive to the output signal from a corresponding one of said plurality of comparison means, said last mentioned means connecting corresponding ones of said plurality of accumulating means to said plurality of comparison means to energize respective ones of said plurality of accumulating means during the time interval of the control signal from corresponding ones of said comparison means.

11. An electrical integrating system comprising, in combination, an electrical function generator, said generating means including a signal limiting circuit, said signal limiting circuit limiting the minimum amplitude of an output signal from said generating means, said generating means being operative to produce a periodic amplitude-varying control signal, a signal comparison means, means for applying to said comparison means an information input signal to be integrated and said control signal, said comparison means comparing the information input signal with said control signal to produce an output signal during time intervals whenever the input signal is greater than the control signal, time responsive accumulating means, and switching means responsive to the output signal from said comparison means to energize said time responsive accumulating means thereby to integrate said input signal.

References Cited in the file of this patent

UNITED STATES PATENTS

| | | |
|---|---|---|
| 2,660,057 | Ackley | Nov. 24, 1953 |
| 2,677,123 | Smoot et al. | Apr. 27, 1954 |
| 2,750,110 | Och | June 12, 1956 |

OTHER REFERENCES

Seely: "Electron Tube Circuit," McGraw-Hill Book Co., New York, 1950, page 139.